United States Patent
Welter et al.

(10) Patent No.: US 9,939,065 B2
(45) Date of Patent: Apr. 10, 2018

(54) PISTON CYLINDER ARRANGEMENT, IN PARTICULAR A SLAVE CYLINDER FOR A HYDRAULIC CLUTCH ACTUATING DEVICE

(71) Applicant: Schaeffler Technologies GmbH & Co. KG, Herzogenaurach (DE)

(72) Inventors: Roland Welter, Buehl (DE); Sebastian Honselmann, Lauf (DE); Jan Sakschewski, Rastatt (DE); Simon Ortmann, Rheinau-Linx (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 467 days.

(21) Appl. No.: 14/416,508

(22) PCT Filed: Aug. 14, 2013

(86) PCT No.: PCT/DE2013/200123
§ 371 (c)(1),
(2) Date: Mar. 31, 2015

(87) PCT Pub. No.: WO2014/032665
PCT Pub. Date: Mar. 6, 2014

(65) Prior Publication Data
US 2015/0247575 A1 Sep. 3, 2015

(30) Foreign Application Priority Data

Aug. 27, 2012 (DE) .......................... 10 2012 215 182
Dec. 19, 2012 (DE) .......................... 10 2012 223 735

(51) Int. Cl.
*F15B 15/24* (2006.01)
*F16J 1/01* (2006.01)
(Continued)

(52) U.S. Cl.
CPC .............. *F16J 1/01* (2013.01); *F16D 23/148* (2013.01); *F16D 25/083* (2013.01); *F16D 25/12* (2013.01);
(Continued)

(58) Field of Classification Search
CPC ..... F15B 15/1466; F15B 15/24; F16D 25/083
See application file for complete search history.

(56) References Cited

U.S. PATENT DOCUMENTS 2,504,406 A * 4/1950 Gandrup ................... B66F 3/42
137/625.11
4,601,374 A * 7/1986 Ladin .................... F16D 25/087
192/85.51
(Continued)

FOREIGN PATENT DOCUMENTS

| DE | 19635101 A1 | 3/1997 |
|---|---|---|
| DE | 102008004027 A1 | 7/2008 |
| EP | 0345451 A2 | 12/1989 |

*Primary Examiner* — F. Daniel Lopez
(74) *Attorney, Agent, or Firm* — Simpson & Simpson, PLLC

(57) ABSTRACT

The invention relates to a piston-cylinder arrangement, in particular a slave cylinder for a hydraulic clutch actuating device, comprising a cylinder housing which is made of a plastic, in which an annular pressure chamber is formed in which a piston is mounted so as to be axially movable for actuation of a clutch release bearing, wherein the inner wall of the pressure chamber forms a guide sleeve. In the case of a piston-cylinder arrangement which stands up to the pressures and temperatures that occur in operation of the clutch actuating device, a stop is situated on the guide sleeve facing the clutch release bearing, the stop being in the form of a threaded connection.

11 Claims, 2 Drawing Sheets

(51) Int. Cl.
*F16D 25/08* (2006.01)
*F16D 25/12* (2006.01)
*F16J 10/02* (2006.01)
*F16D 23/14* (2006.01)
*F15B 15/14* (2006.01)

(52) U.S. Cl.
CPC ............ *F16J 10/02* (2013.01); *F15B 15/1466* (2013.01); *F15B 15/24* (2013.01)

(56) References Cited

U.S. PATENT DOCUMENTS 4,660,702 A * 4/1987 Flotow .................... F16D 13/58
192/109 R
5,810,145 A * 9/1998 Thomire ............... F16D 25/083
192/115

* cited by examiner

PISTON CYLINDER ARRANGEMENT, IN PARTICULAR A SLAVE CYLINDER FOR A HYDRAULIC CLUTCH ACTUATING DEVICE

CROSS-REFERENCE TO RELATED APPLICATIONS

The present application is the U.S. national stage application pursuant to 35 U.S.C. § 371 of International Application No. PCT/DE2013/200123, filed Aug. 14, 2013, which application claims priority from German Patent Application Nos. DE 10 2012 215 182.6, filed Aug. 27, 2012, and DE 10 2012 223 735.6, filed Dec. 19, 2012, which applications are incorporated herein by reference in their entireties.

TECHNICAL FIELD

The invention relates to a piston-cylinder arrangement, in particular a slave cylinder for a hydraulic clutch actuating device, comprising a cylinder housing which is made of a plastic, in which an annular pressure chamber is formed in which a piston is mounted so as to be axially movable for actuation of a clutch release bearing, wherein the inner wall of the pressure chamber forms a guide sleeve.

BACKGROUND

Central clutch releases for hydraulic clutch actuation are known, in particular for dual-clutch transmissions, in which the cylinder housing is made of a plastic. A cylinder wall of the cylinder housing delimits an annular pressure chamber radially toward the outside, in which a ring piston which is operationally connected to the clutch is movably accommodated. In this case, the cylinder housing is formed of two cylinder walls arranged concentrically to each other, where the inner cylinder wall forms the boundary of the pressure chamber and is referred to as a guide sleeve.

In operating states of the slave cylinder, in particular at the boundary zone of the forces and beyond, it may be that the clutch release bearing loses the partner for power transmission, preferably the diaphragm spring of the clutch. At the same time it must be ensured that the release unit is not able to travel beyond the specified maximum extension, which is guaranteed by a stop anchored on the cylinder housing. If this cannot be guaranteed, the slave cylinder will destroy itself and cause consequential damage. In addition to the strong forces occurring in the slave cylinder during operation of the clutch actuating system, thermal stress occurs.

It is known to use a sheet metal ring as a transport stop for a slave cylinder of the clutch actuating device. The shaft of this sheet metal ring is flanged in an undercut in the cylinder housing. A sheet metal ring of this sort functions only as a transport restraint, and is designed for the stresses that develop during transport from the manufacturer of the clutch actuating device to the recipient, and prevents breakup of the slave cylinder during transport.

Thus there exists a long felt need for a simply and economically producible piston-cylinder arrangement which has a stop for the piston that stands up both to the pressures which occur in operation of the clutch actuating device and to the thermal stresses.

SUMMARY

The object is fulfilled according to the invention by a stop being positioned on the guide sleeve, the stop being in the form of a threaded connection. The stop having a radially outward facing surface that faces the clutch release bearing, and a radially inward facing surface that faces the guide sleeve. In this way, a stop is provided which prevents the piston from being able to travel beyond the maximum permissible extension under operating conditions, which reliably prevents destruction of the system.

According to the aspects illustrated herein, there is provided a piston-cylinder arrangement, in particular a slave cylinder for a hydraulic clutch actuating device, comprising a cylinder housing comprising an inside wall, wherein the cylinder housing is made of a plastic, a guide sleeve formed by the inside wall of the cylinder housing, a stop arranged on the guide sleeve, the stop facing a clutch release bearing, wherein the stop is a threaded connection and, an annular pressure chamber formed by the cylinder housing, wherein the piston is arranged in the annular pressure chamber and is axially movable in order to actuate the clutch release bearing.

In a preferred embodiment, the threaded connection consists of a threading formed on the guide sleeve, onto which a stop nut is screwed. Such a stop is simple to realize when assembling the slave cylinder, the stop nut being provided as the actual stop for the piston. In the event of misuse, the piston will now come into contact with the stop nut when the maximum extension is exceeded, which prevents the escape of hydraulic fluid, since over traveling the exterior wall of the cylinder housing by the piston is reliably prevented with the help of the stop, so that the pressure chamber is always sealed.

In one design, a thread-locking adhesive is applied between the stop nut and the threading. Through the use of this thread-locking adhesive, the stop nut is simultaneously used as a transport restraint and prevents breakup of the slave cylinder during transport from the manufacturer of the clutch actuating device to the recipient.

Alternatively, the stop nut is secured by hot caulking or laser welding or by a positive lock with an elastic element on the guide sleeve. This fastening method also prevents the stop out from turning, which reliably prevents the stop nut from loosening due to vibrations occurring in the motor vehicle.

In one variant, the threading is formed on a side of the guide sleeve facing the piston. In this case, the threading serves as a male thread for the stop nut.

In one design, the piston has a free cut on a side facing the guide sleeve, which is engaged by the stop nut at the maximum extension of the piston. This design results in a space-saving version of the slave cylinder, which is reliably prevented from maximum extension.

In another variant, the threading is formed on a side of the guide sleeve facing away from the piston. The threading is thus formed as a female thread, into which the stop out is screwed. In a space-saving variant of this type, the overhang of the stop nut, which encircles the guide sleeve, is used simultaneously as a stop for the piston at maximum extension.

In a refinement, flanks of the threading rise flatly in the direction of force. Through this design measure, the axial force introduced by the piston is well introduced into the threaded connection, which prevents stripping of the threads and increases the holding strength of the threaded connection.

In a preferred embodiment, the stop nut and the threading are produced using a plastic, or the stop nut consists of a metal. Production of the stop nut and of the guide sleeve carrying the threading is conceivable in various material pairings. In particular, if the guide sleeve is made of a plastic, it can be produced in a single piece with the cylinder housing during construction of the latter. This reduces production steps and lowers the cost.

BRIEF DESCRIPTION OF THE DRAWINGS

Various embodiments are disclosed, by way of example only, with reference to the accompanying drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Figure 1:
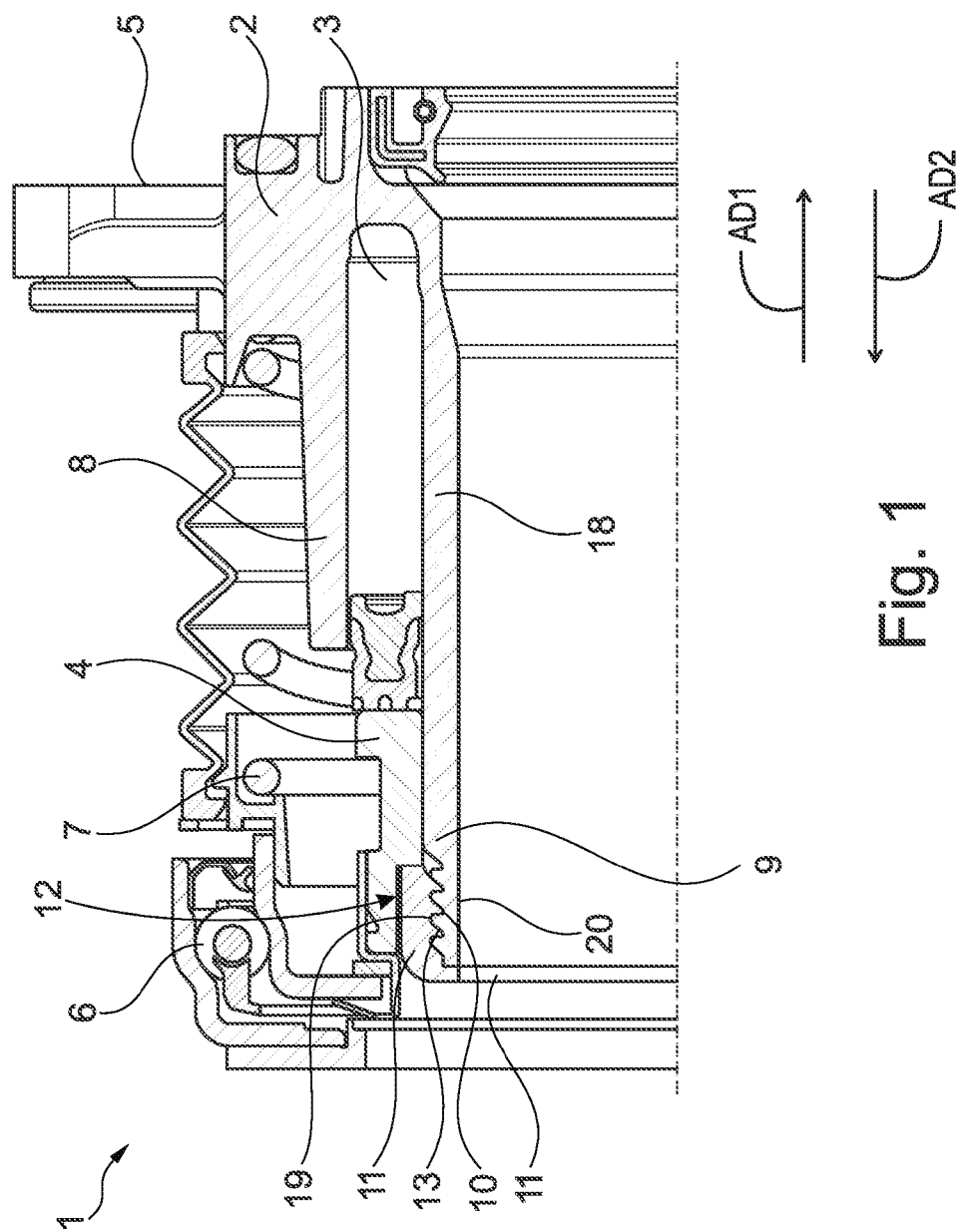
FIG. 1 is a first exemplary embodiment of the piston-cylinder arrangement according to the invention, and, FIG. 2 is a second exemplary embodiment of the piston-cylinder arrangement according to the invention.

FIG. 1 depicts a first embodiment of slave cylinder 1, which is employed in a dual-clutch transmission. In this case, slave cylinder 1 consists of cylinder housing 2 made of plastic, which comprises annular pressure chamber 3 in which piston 4 is supported so that it is axially movable. Through a connector, not shown in further detail, of cylinder housing 2, the hydraulic fluid reaches pressure chamber 3 and results in actuation of piston 4 and thus actuation of clutch release bearing 6.

Preloading spring 7, which is pre-stressed against clutch release bearing 6, presses against cylinder housing 2 in the area of attachment 5 of the slave cylinder. To form pressure chamber 3, cylinder housing 2 has an outer wall 8 and an inner wall designated as guide sleeve 9. Formed on guide sleeve 9 is outer threading 10 onto which stop nut 11 is screwed. At maximum extension of piston 4, stop nut 11 engages free cut 12 of piston 4, whereby piston 4 is prevented from further axial movement. Free cut 12 is a radial cutout or notch on the radially inward facing surface of piston 4. Free cut 12 comprises a radially inward facing surface and an axial surface facing a first axial direction. The axial surface of free cut 12 engages and/or abuts against stop nut 11 which prevents further axial movement of piston 4. Free cut 12 may preferably be reinforced by changes in material, or may be realized by dividing the components in two, which causes the introduction of force at stop nut 11 to be realized through higher-strength components.

Between stop nut 11 and outside threading 10 a thread-locking adhesive 13 is situated, which prevents stop nut 11 from loosening from outside threading 10 during transport of the clutch actuating device from the manufacturer to the recipient. Stop nut 11 serves simultaneously as a transport restraint.

Figure 2:
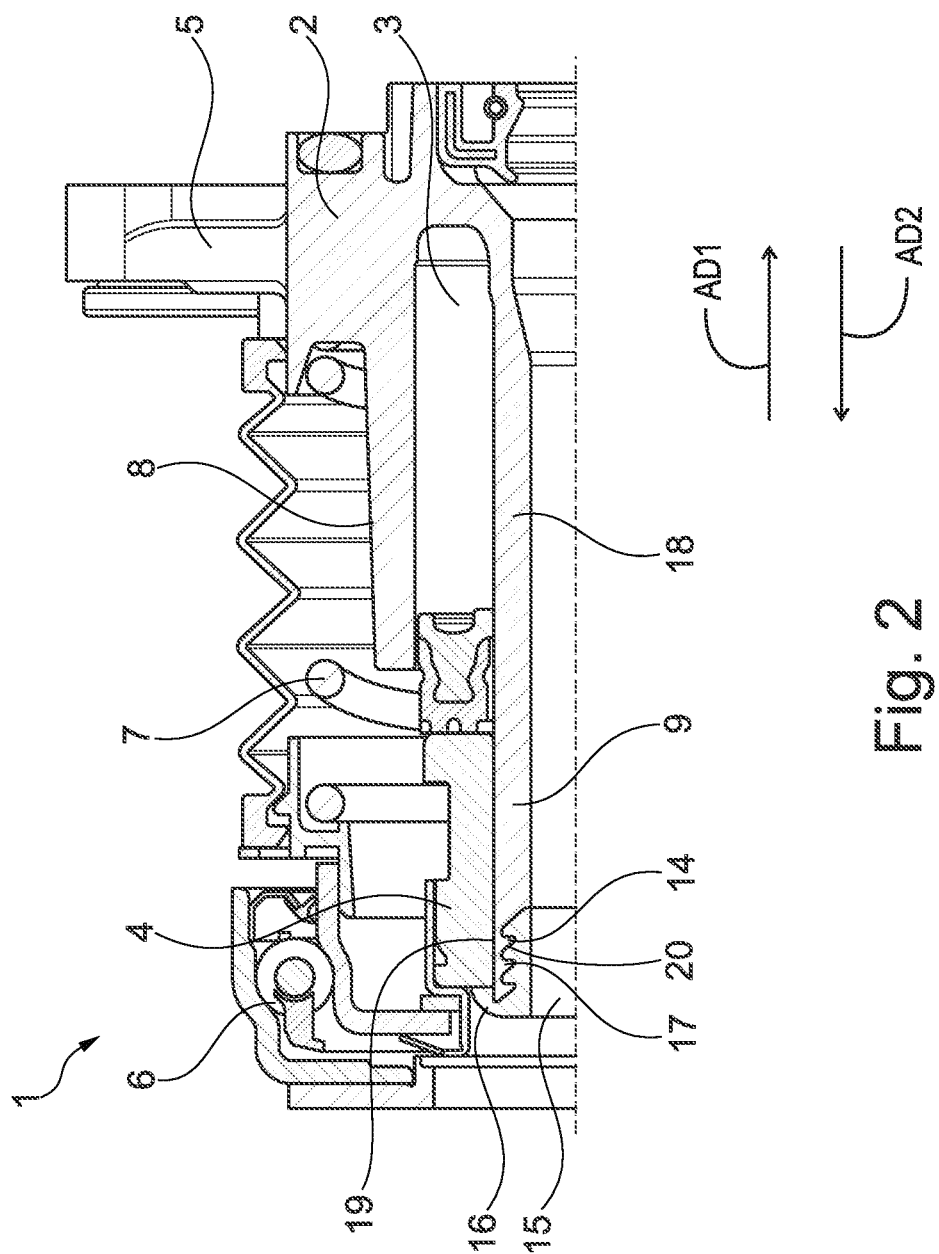

FIG. 2 depicts a second embodiment of slave cylinder 1, which differs from the first embodiment only in the configuration of the stop nut and the threading. The threading is now formed on guide sleeve 9 as female thread 14, into which stop nut 15 is screwed. Stop nut 15 has an overhang 16 which encircles the end of guide sleeve 9 and serves as a stop for the maximum extension of piston 4. Here too, bonding female threading 14 with stop nut 15 is advantageous, in order to achieve securing against rotation fir stop nut 15.

As an alternative to introducing the thread-locking adhesive, hot caulking of female thread 14 is possible using two additional studs, not depicted in further detail, which point in the direction of clutch release bearing 6. Besides the described options, securing of stop nut 15 against rotation is also guaranteed by laser welding, by means of which stop nut 15 is reliably connected to guide sleeve 9 and can no longer rotate. These alternative means of securing rotation also apply to stop nut 11 and male threading 10 depicted in connection with FIG. 1. In addition, other frictional, positive or material securing options are also conceivable.

Flanks 17 of the threads, both of male thread 10 and of female thread 14, are formed so that an optimal introduction of force into the component occurs when the thread is subjected to an axial load.

Stop nuts 11, 15 and guide sleeve 9 which carries threading 10, 14 may be made in various material pairings. Thus plastic-plastic pairings are just as realizable as steel or aluminum designs for stop nuts 11, 15 in combination with a plastic design for guide sleeve 9 which carries threading 10, 14.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMBERS 1 slave cylinder
2 cylinder housing
3 pressure chamber
4 piston
5 connector
6 clutch release bearing
7 preloading spring
8 exterior wall
9 guide sleeve
10 male threading
11 stop nut
12 free cut
13 thread-locking adhesive
14 female threading
15 stop nut
16 overhang
17 flank
18 inner wall
19 radially outward facing surface
20 radially inward facing surface
AD1 axial direction
AD2 axial direction

The invention claimed is:

1. A piston-cylinder arrangement for a hydraulic clutch actuating device, comprising:
   a cylinder housing comprising a guide sleeve, said guide sleeve having a threading formed thereon;
   a stop screwed onto said guide sleeve, wherein said stop is operatively arranged as an axial boundary for a piston; and,
   an annular pressure chamber formed by said cylinder housing;
   wherein said piston is arranged in said annular pressure chamber and is axially movable in order to actuate a clutch release bearing.

2. The piston-cylinder arrangement recited in claim 1, wherein a thread-locking adhesive is applied between said stop and said threading.

3. The piston-cylinder arrangement recited in claim 1, wherein said stop is secured by hot caulking on said guide sleeve.

4. The piston-cylinder arrangement recited in claim 1, wherein said stop is secured by:
   laser welding; or,
   by a positive lock with an elastic element on said guide sleeve.

5. The piston-cylinder arrangement recited in claim 1, wherein said threading is formed on a radially outward facing side of said guide sleeve that faces said piston.

6. The piston-cylinder arrangement recited in claim 5, wherein said piston has a free cut on a radially inward facing side of said piston facing said radially outward facing side of said guide sleeve, which is engaged by said stop at a maximum extension of said piston.

7. The piston-cylinder arrangement recited in claim 1, wherein said threading is formed on a radially inward facing side of said guide sleeve that faces away from said piston.

8. The piston-cylinder arrangement recited in claim 1, wherein flanks of said threading are angled in a first axial direction.

9. The piston-cylinder arrangement recited in claim 1, wherein said stop and said threading are produced from a plastic, or said stop consists of a metal.

10. A piston-cylinder arrangement for a hydraulic clutch actuating device, comprising:
    a cylinder housing comprising a guide sleeve, the guide sleeve includes threading formed on a radially inward facing side;
    a stop arranged on said guide sleeve, wherein said stop is screwed onto the threading and is operatively arranged as an axial boundary for a piston; and,
    an annular pressure chamber formed by said cylinder housing;
    wherein said piston is arranged in said annular pressure chamber and is axially movable in order to actuate a clutch release bearing.

11. A piston-cylinder arrangement for a hydraulic clutch actuating device, comprising:
    a cylinder housing comprising a guide sleeve;
    a stop:
        arranged on said guide sleeve via a threaded connection;
        completely overlaps the guide sleeve in a radial direction; and,
        is operatively arranged as an axial boundary for a piston; and,
    an annular pressure chamber formed by said cylinder housing;
    wherein said piston is arranged in said annular pressure chamber and is axially movable in order to actuate a clutch release bearing.

* * * * *